US012195699B2

(12) United States Patent
Piorkowski et al.

(10) Patent No.: US 12,195,699 B2
(45) Date of Patent: Jan. 14, 2025

(54) DISSOLVABLE TOILET BRUSH FORMULATIONS CONTAINING POLYETHYLENE GLYCOL

(71) Applicant: Henkel AG & Co. KGaA, Düsseldorf (DE)

(72) Inventors: Daniel Thomas Piorkowski, Fairfield, CT (US); Christopher Michael Rodriguez, Brewster, NY (US); Janet Coope-Epstein, Trumbull, CT (US); Sabine Schuemann, Duesseldorf (DE); Peter Schmiedel, Duesseldorf (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 336 days.

(21) Appl. No.: 17/897,015

(22) Filed: Aug. 26, 2022

(65) Prior Publication Data

US 2024/0067897 A1 Feb. 29, 2024

(51) Int. Cl.

| | |
|---|---|
| ***C11D 1/00*** | (2006.01) |
| ***C11D 1/14*** | (2006.01) |
| ***C11D 3/10*** | (2006.01) |
| ***C11D 3/20*** | (2006.01) |
| ***C11D 3/37*** | (2006.01) |
| ***C11D 17/00*** | (2006.01) |

(52) U.S. Cl.

CPC ................ *C11D 1/143* (2013.01); *C11D 3/10* (2013.01); *C11D 3/2065* (2013.01); *C11D 3/3707* (2013.01); *C11D 17/0073* (2013.01)

(58) Field of Classification Search

None

See application file for complete search history.

(56) References Cited

U.S. PATENT DOCUMENTS

| | | | |
|---|---|---|---|
| 2,755,497 | A | 7/1956 | Greacen, Jr. |
| 4,031,673 | A | 6/1977 | Hagelberg |
| 4,493,124 | A | 1/1985 | Agapiou |
| 4,642,836 | A | 2/1987 | Bokmiller |
| 4,852,201 | A | 8/1989 | Wundrock et al. |
| 5,471,697 | A | 12/1995 | Daconta |
| 5,630,243 | A | 5/1997 | Federico et al. |
| 5,888,002 | A | 3/1999 | Fenstersheib |
| 6,094,771 | A | 8/2000 | Egolf et al. |
| 6,124,251 | A | 9/2000 | Rader et al. |

(Continued)

FOREIGN PATENT DOCUMENTS

| | | |
|---|---|---|
| EP | 1553864 B1 | 7/2005 |
| ES | 2622227 T3 | 7/2017 |

(Continued)

OTHER PUBLICATIONS

Co-pending Application, U.S. Appl. No. 17/301,837, inventors Larracuente, A., et al., filed Apr. 15, 2021 (Not yet Published).

*Primary Examiner* — Necholus Ogden, Jr.

(74) *Attorney, Agent, or Firm* — Blank Rome LLP

(57) ABSTRACT

A compressed unit dose toilet cleaning tablet for use with a wand. The composition contains an anionic surfactant, a carbonate or bicarbonate salt, an organic acid, and about 10% to about 40% by weight polyethylene glycol having molecular weight greater than 3,350. A unit dose of the composition is compressed into a tablet or puck that dissolves in toilet water after cleaning.

18 Claims, 3 Drawing Sheets

(56) References Cited

U.S. PATENT DOCUMENTS

| | | | | |
|---|---|---|---|---|
| 6,463,620 | B2 | 10/2002 | Busha | |
| 6,863,830 | B1 | 3/2005 | Purdy et al. | |
| 6,939,841 | B2 | 9/2005 | Requejo | |
| 7,065,825 | B2 | 6/2006 | Minkler et al. | |
| 7,127,768 | B2 | 10/2006 | Blum et al. | |
| 7,146,676 | B2 | 12/2006 | Kubes et al. | |
| 7,159,265 | B2 | 1/2007 | Soller et al. | |
| 7,232,364 | B2 | 6/2007 | Hibbard | |
| 7,275,276 | B2 | 10/2007 | Jaszenovics et al. | |
| 7,530,138 | B1 | 5/2009 | Platt | |
| 7,563,756 | B2 | 7/2009 | Brady | |
| 7,650,663 | B2 | 1/2010 | Michaels et al. | |
| 7,827,648 | B2 | 11/2010 | Soller et al. | |
| 9,408,521 | B2 | 8/2016 | Molinet et al. | |
| 2002/0061831 | A1 | 5/2002 | Kaziska et al. | |
| 2003/0040459 | A1* | 2/2003 | Araya .................... | C11D 3/124<br>510/507 |
| 2007/0079460 | A1 | 4/2007 | Tapp et al. | |
| 2012/0246854 | A1 | 10/2012 | Uchiyama et al. | |
| 2013/0104304 | A1 | 5/2013 | Wilson et al. | |
| 2016/0106274 | A1 | 4/2016 | Eun | |
| 2018/0296043 | A1 | 10/2018 | Meier et al. | |
| 2021/0052117 | A1* | 2/2021 | O'Brien ................. | A47K 11/10 |

FOREIGN PATENT DOCUMENTS

| | | | | |
|---|---|---|---|---|
| GB | 738299 | A | 10/1955 | |
| GB | 2242130 | A | 9/1991 | |
| GB | 2329325 | A | 3/1999 | |
| WO | 0149818 | A1 | 7/2001 | |
| WO | WO-2005061689 | A1 * | 7/2005 | ......... C11D 17/0073 |
| WO | 2014039356 | A1 | 3/2014 | |

* cited by examiner

DISSOLVABLE TOILET BRUSH FORMULATIONS CONTAINING POLYETHYLENE GLYCOL

FIELD OF THE INVENTION

The present invention is in the field of household and industrial cleaning in applications for cleaning toilets. The present invention relates to dissolvable unit dose formulations that can be used with a wand for manually cleaning toilets.

BACKGROUND OF THE INVENTION

Toilet brushes are typically used to swirl cleaning chemicals around a toilet bowl and then to scrub the sides of the bowl with those chemicals and water, so as to assist in removing stains along the bowl sides. After using such brushes, a consumer will typically attempt to rinse off the brush by swirling it in the bowl water. However, cleaning chemicals, feces, urine, and stray bits of paper typically found in the toilet can be retained on the brush or in its holder.

Numerous mechanical devices have been proposed to overcome disadvantages of a toilet brush having a permanently affixed head. Several commercially available products include a removable head that must be thrown away in the trash. For instance, US Patent Application Publication No. 2016/0106274 discloses a non-woven cleaning fabric layer comprising a cleaning composition, and a functional non-woven fabric layer comprising a functional composition. The cleaning composition comprises an anionic surfactant, an ethanolamine-based compound, a pigment, a dye, or a mixture thereof, and a solvent.

GB 738,299 discloses a toilet cleaning device where the head is slipped into a swab and a toilet is then cleaned by wiping the swab around the surface of the bowl of the toilet. Removal of the swab is achieved by shouldering the swab against the rim of a toilet bowl and pulling the holder away to cause the swab to slip off, into the bowl, and dissolve prior to being flushed away. Other flushable and replaceable brush head elements are disclosed in e.g., U.S. Pat. Nos. 2,755,497, 4,031,673, 5,630,243, and 6,094,771 and GB 2,329,325.

U.S. Pat. No. 7,650,663 discloses flushable heads that are insertable in a permanent type of wand. The brush head may be a stack of sheets of water-dissolvable material. The sheets are compressed to bind them together into a stack. Surface indentations and piercing of layers at the indentations are used to bind the brush head layers together securely without the need for binding adhesives, and to facilitate clamping. The heads releasable from the wand and are said to break up and behave like toilet paper, so they are flushable after use.

However, flushable heads, such as those disclosed in U.S. Pat. No. 7,650,663 are water degradable, as opposed to dissolvable. Thus, oftentimes consumers will opt to discard these heads in their garbage for fear of clogging their toilets as flushable heads take longer to break up and/or have the tendency to degrade incompletely.

Water solubility (as opposed to degradability) is a desirable feature for a toilet cleaning "brush" because it allows the head to be flushed immediately after use, thereby avoiding the need to transport the dripping head to a garbage can, and avoiding any odors that may develop if the brush head were left in a garbage can for some time period after use. It also avoids the potential for clogging that can occur when ingredients of a pad dissolve incompletely and/or take a long time to break up.

U.S. Pat. No. 5,471,697 discloses a toilet cleaning device that has a cleaning head in the shape of a foot. This head is able to clean underneath the rim of the toilet. However, a user has to continually rotate the device as they clean underneath the rim which involves two hands. This is inconvenient and it also causes one of the hands to be closer to the bowl which may have germs. The disposable feet are made from enzyme-coated biodegradable polymer particles, acrylic polymers, vinyl polymers or copolymers containing acid groups, sodium propionate or polyethylene glycol; thus, they are expensive and may take considerable time to dissolve. Furthermore, in order to remove the head from the shaft, the shaft has to be left in the toilet bowl while the head dissolves. This renders the toilet unusable during that period.

WO 2014/039356A1 discloses dissolvable unit doses with an applicator for cleaning toilets but provides no details on a suitable cleaning formulation for the dissolvable unit dose.

There is a need for improved toilet "brush" head formulations. In particular, there is a need for solid unit dose cleaning compositions that can be attached to a wand apparatus to mechanically clean a toilet bowl surface and that are dissolvable in toilet water after they are used to clean the bowl.

It is an object of the invention to provide such dissolvable toilet brush products that have a good dissolution rate, a strong structural integrity (so it does not crack during shipment or while in use), provide good foaming (an indication of cleaning efficacy), and are resistant to significant humidity abuse.

SUMMARY OF THE INVENTION

The foregoing is achieved by provision of dissolvable solid unit dose formulations e.g., compressed tablets, that can be used with a wand apparatus to clean a toilet surface. The unit doses can be removably attached to the cleaning wand. The dissolvable formulations alleviate fear of flushing solid material and enables the consumer to clean the toilet and then see the solid dissolve during/after use. The formulations include surfactants, organic acid, an organic acid buffering agent, and polyethylene glycol having molecular weight greater than 3,350, which are formed into a tablet or "puck" having a top surface and a bottom surface having a diameter and a height extending from the top surface to the bottom surface, the top surface having an indentation in at least one of its surfaces that is adapted to receive and engage a wand.

It has been unexpectedly discovered that including certain polyethylene glycol cohesion polymers enables an improved product that has both a rapid dissolution and a structural integrity during use along with good foaming and resistance to humidity abuse. Compressed compositions retain sufficient hardness to facilitate cleaning a toilet surface but are still able to substantially dissolve when submerged in toilet water to enable easy disposal by flushing with toilet water.

In some embodiments, the polyethylene glycol has molecular weight greater than 4,000, more preferably greater than 6,000, most preferably about 7,300 to about 9,000. In certain particularly preferred embodiments, the polyethylene glycol has an average molecular weight of about 8,000.

The polyethylene glycol having molecular weight greater than 3,350 typically comprises about 10% to about 40%, more preferably about 12.5% to about 25%, most preferably about 15% to about 25% by weight of the composition.

In some embodiments, the surfactant is an anionic surfactant. The anionic surfactant is preferably selected from Sodium Dodecylbenzenesulfonate, Sodium Cocoyl Isethionate, Sodium Olefin Sulphonate, and combinations thereof. In certain preferred embodiments, the anionic surfactant consists of an alpha olefin sulfate, such as Sodium Olefin Sulphonate. In some embodiments, the anionic surfactant is present at about 5% to about 50% by weight of the composition, more preferably about 10% to about 30% by weight of the composition, most preferably about 12% to about 25% by weight of the composition.

In certain embodiments, a weight ratio of the anionic surfactant to the polyethylene glycol having molecular weight greater than 3,350 is about 1:2 to 2:1

In certain embodiments, the organic acid comprises about 5% to about 60% by weight of the cleaning composition, and is selected from the group consisting of glycolic, malic, lactic, citric acid, and salts and combinations thereof. In certain of those embodiments, the acid consists of glycolic acid or citric acid. In preferred compositions, the organic acid is citric acid. More preferably, the organic acid comprises about 10% to about 45% by weight of the cleaning composition. In certain preferred embodiments, the organic acid comprises about 25% to about 45% by weight of the cleaning composition and/or is sufficient to provide toilet water with a pH less than 4.6 when the formulation is dissolved in the toilet water.

In certain embodiments, the organic acid buffering agent comprises about 5% to about 50% by weight of the tablet and comprises a carbonate or bicarbonate salt and/or trisodium citrate. In some of those embodiments, the buffering agent consists of a carbonate or bicarbonate salt, such as sodium bicarbonate. In certain of those embodiments, the carbonate or bicarbonate salt is present at about 20% to about 30% by weight of the compositions.

In certain embodiments, the formulation is substantially free of soap, which was observed to negatively affect the stability and performance of the formulation. Preferably, the formulation is free of soap. As used herein, soap refers to monovalent salts of monocarboxylic fatty acids.

In certain preferred embodiments, the composition results in a pH less than 4.6 when the composition is dissolved in toilet water, such as pH of about 4.3.

In certain embodiments, the composition further comprises a glidant, a fragrance, and a dye. The fragrance and dye enhance the sensorial experience for a user but do not materially affect dissolution or hardness of a solid unit dose.

In certain preferred embodiments, the composition consists essentially of, or consists of, anionic surfactant, organic acid, organic acid buffering agent, polyethylene glycol having weight molecular weight greater than 3,350, lubricant or glidant, fragrance and dye.

In some embodiments, a top surface of the solid unit dose/tablet has an indentation from 25% to 100% of a height of the solid that is adapted to receive and engage with a wand member. In preferred embodiments, the indentation is a cylindrical socket and the depth of the cylindrical socket is the same as height. In certain embodiments, a ratio of height to diameter of a compressed tablet comprising the compositions described herein is between 0.2 and 0.3. Preferably the tablet has a height of about 0.5 inches or greater than 0.5 inches and a diameter less than 3 inches, preferably less than 2.5 inches to ensure that the puck does not get caught in the outflow pipe of a toilet.

The puck or tablet can be provided in a package with the wand member. In certain embodiments, a plurality of the pucks or tablets is contained in a sealed package, which may or may not include a wand member that is adapted to receive and engage with the puck/tablet.

The compressed solids weigh about 25 to about 45 grams, more preferably about 25 to about 35 g, and have a hardness of 15 N or greater than 15 N, more preferably above 30 N. In particularly preferred embodiments, the hardness of a compressed tablet is above 40 N, most preferably above 50 N or even above 100 N.

Such tablets enable a product that has a good dissolution rate, structural integrity (so it does not crack during shipment or while in use), provides foaming (an indication of cleaning efficacy), is resistant to significant humidity abuse, and provides good cleaning. The tablets will preferably have about 50% or greater dissolution in toilet water after 10 minutes. Moreover, the tablets preferably break when submerged in water in less than 3 minutes, but greater than 1 minute to ensure acceptable cleaning time before dissolving.

In one embodiment, a compressed toilet brush composition comprises an anionic surfactant, a carbonate or bicarbonate salt, an organic acid, and about 15% to about 25% by weight polyethylene glycol having a weight of about 7,300 to 9,000, wherein greater than 30% of the tablet dissolves when submerged in toilet water without agitation for 10 minutes. In some of those embodiments, the composition comprises about 10% to about 25% by weight anionic surfactant. The anionic surfactant is preferably an alpha olefin sulphonate. The tablet has a hardness of at least 50 N.

In one preferred embodiment, a compressed toilet brush composition consists of about 10% to about 25% by weight anionic surfactant, about 10% to about 20% by weight citric acid, about 10% to about 40% by weight of a citric acid buffering agent, about 15% to about 25% by weight polyethylene glycol having a weight average molecular weight of about 8,000; and at least one of a lubricant, glidant, dye, and fragrance. The anionic surfactant is preferably an alpha olefin sulphonate.

The present invention also provides methods of production of such unit dose tablets, and methods of use of such compositions in processes for cleaning toilets by introducing one of the unit dose products into a toilet bowl, whereby the cleaning system is released such that it comes into contact with a soiled toilet bowl under conditions for the removal of one or more soils from the toilet bowl. The unit doses dissolve in toilet water after they are used to clean the bowl.

DETAILED DESCRIPTION OF THE INVENTION

Figure 1:
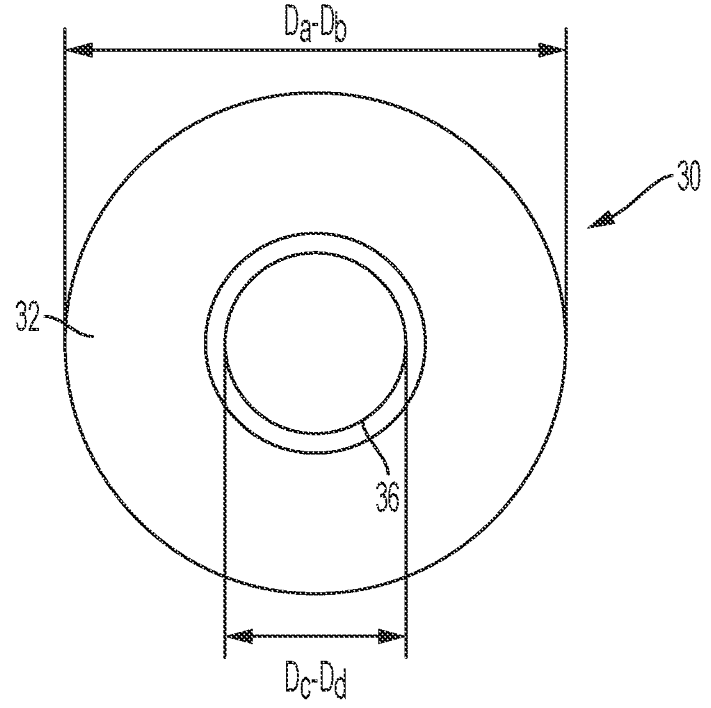
FIG. 1 is a top view of a solid unit dose toilet cleaning composition of the present invention that can be releasably attached to a wand.

The following detailed description is merely exemplary in nature and is not intended to limit the compositions or the methods for producing or using the same. Furthermore, there is no intention to be bound by any theory presented in the preceding background or the following detailed description.

Except in the operating and comparative examples, or where otherwise explicitly indicated, all numbers in this description indicating amounts or ratios of material or conditions of reaction, physical properties of materials and/or use are to be understood as modified by the word "about".

The term "about" as used in connection with a numerical value throughout the specification and the claims denotes an interval of accuracy, familiar and acceptable to a person skilled in the art. In general, such interval of accuracy is +−10%. Thus, "about ten" means 9 to 11. All numbers in this description indicating amounts, ratios of materials, physical properties of materials, and/or use are to be understood as modified by the word "about," except as otherwise explicitly indicated.

Weight percent, percent by weight, wt %, wt-%, % by weight, and the like are synonyms that refer to the concentration of a substance as the weight of that substance divided by the weight of the composition and multiplied by 100. As used in this application, the term "wt. %" refers to the weight percent of the indicated component relative to the total weight of the solid cleaning composition, unless indicated differently. The weight percentage of an individual component does not include any water supplied with that component, even if the component is supplied as an aqueous solution or in a liquid premix, unless otherwise specified.

The recitation of numerical ranges by endpoints includes all numbers within that range (e.g., 1 to 5 includes 1, 1.5, 2, 2.75, 3, 3.80, 4, and 5).

Provided herein are toilet cleaning products that include a cleaning composition comprising surfactant, organic acid and an organic acid buffering agent in a compressed unit dose tablet or "puck" and a wand that can releasably engage the tablet such that the combination can be used as a toilet cleaning brush. The unit dose tablets are capable of dissolving in water in a short amount of time so that they can be flushed down the toilet after use.

"Cleaning" means to perform or aid in soil removal, bleaching, microbial population reduction, or combination thereof.

As used herein, the term "comprising" means including, made up of, composed, containing, characterized by, or having.

As used herein, the term "brush" means an implement with a handle and including of a solid member at one end that can be used for cleaning, scrubbing, applying a liquid or powder to a surface. The solid member of the brush may be referred to as a "head." The heads described herein are compressed tablets.

A unit dose refers to a cleaning composition unit sized so that the entire unit is used during a single cleaning cycle. Typically, a unit dose will weigh about 20 to 45 grams. A plurality of the unit doses can be available in a package having a size of between about 40 grams and about 1,000 grams.

The various embodiments of the unit dose have a top surface, a bottom surface, and a height extending from the top surface to the bottom surface. The unit dose comprises an indentation in at least one of its surfaces that is adapted to receive and engage a wand. Preferably, the indentation is from 25% to 100% of the height of the solid.

Figure 2:
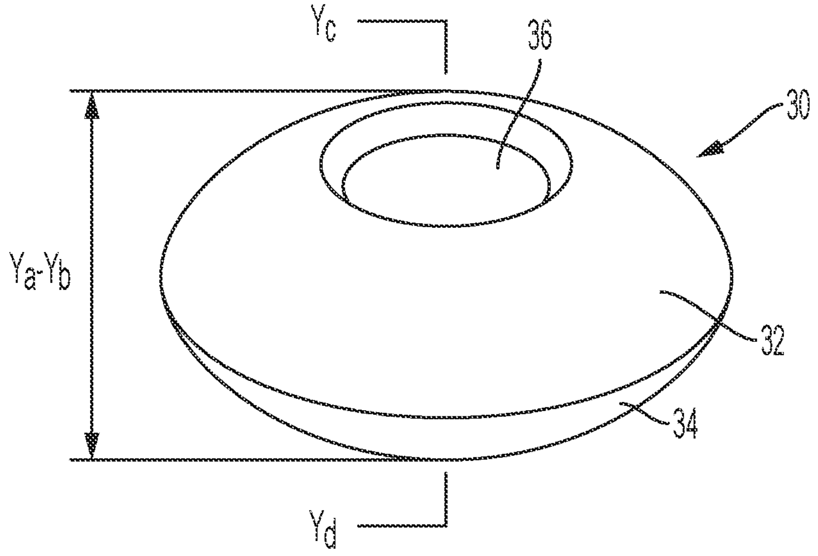
FIG. 2 is a perspective view of the unit dose of FIG. 1.
Figure 3:
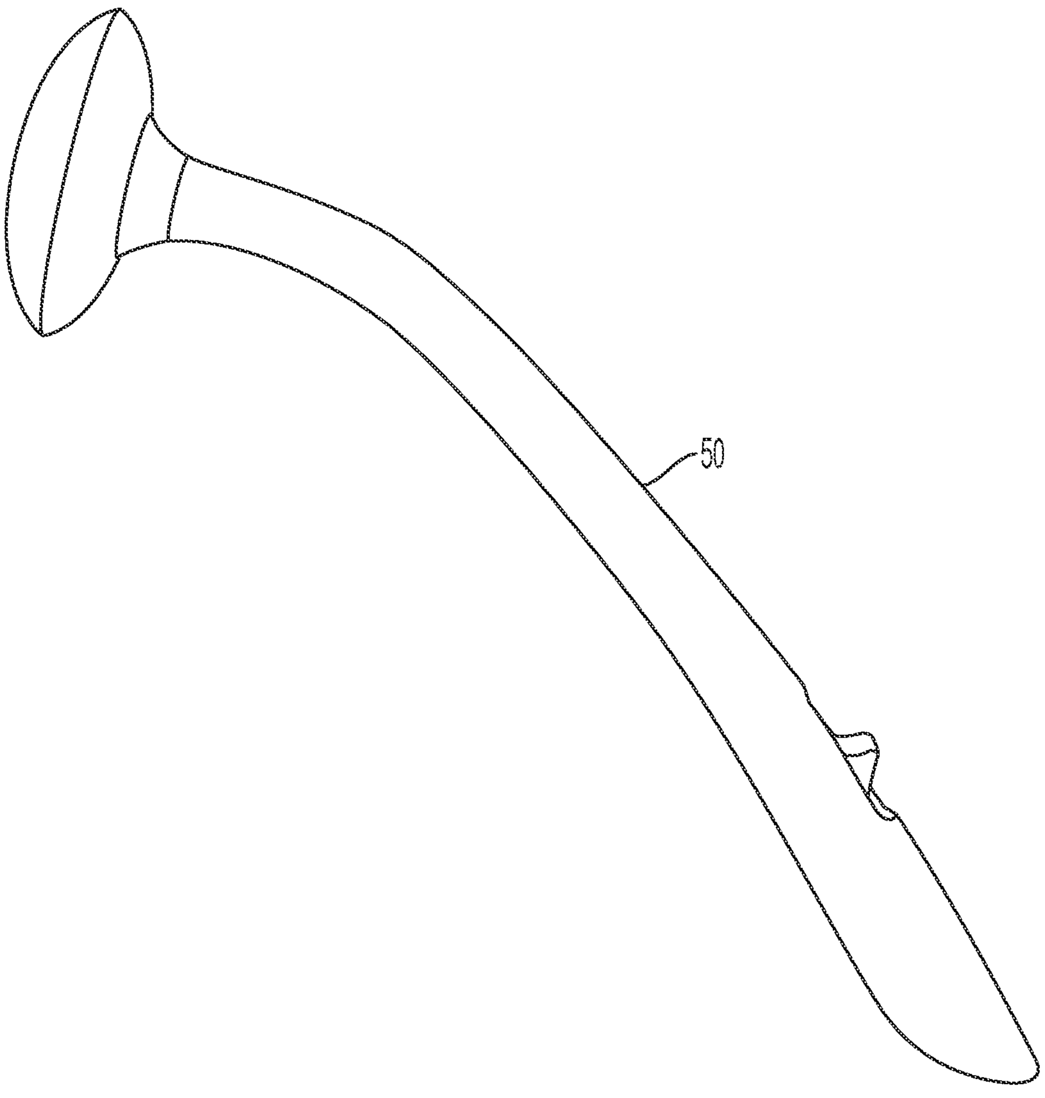
FIG. 3 shows an exemplary re-useable wand that can be used with a tableted composition described herein.

An exemplary solid unit dose head of the present invention is shown in FIGS. 1 and 2. The head 30 contains a top surface 32, a bottom surface 34, a height $Y_a$-$Y_b$ extending from the top surface to the bottom surface, and a diameter $D_a$-$D_b$. An indentation, specifically, a cylindrical socket 36 is contained in the top surface and is adapted to receive and frictionally engage with wand 50, as shown in FIG. 3. The socket 36 has a diameter $D_c$-$D_d$ that is less than the diameter $D_a$-$D_b$. The depth $Y_c$-$Y_d$ of the cylindrical socket 36 is the same as height $Y_a$-$Y_b$ or may be less than the height $Y_a$-$Y_b$.

The unit dose head 30 contains a cleaning composition comprised of powders, granules, and/or pellets that have been compressed into a tablet.

Although cleaning head 30 is shown as substantially cylindrical and having a diameter $D_a$-$D_b$, it may take other shapes that will be appreciated by those of skill in the art. The solid head 30 may be in various compressed forms including, for example, pellets, blocks, and tablets, but not powders. Likewise, the socket 36 may take other shapes, which may or may not correspond to the shape of tablet 30.

In certain embodiments, the solid unit dose cleaning head 30 weighs about 1 to about 70 grams, more preferably about 10 to about 50 grams or about 25 to about 45 grams. Due to clogging concerns, it is preferable that any dimension be less than 3 inches, as a standard outflow pipe of a toilet is 3 inches in diameter (inside diameter). In older houses, it may be possible for the outflow pipe to be closer to 2 inches (inside diameter), so, in some cases, a puck with a diameter less than 2 inches may be preferred. A height to diameter ratio may be between 0.2 and 0.3.

In some embodiments, the solid unit dose cleaning head is a tablet having a hardness of at least 15 N. The solid unit dose toilet cleaning composition and/or dissolvable toilet cleaning tablet preferably has a hardness of 15 N or greater than 15 N, more preferably above 30 N. In particularly preferred embodiments, the hardness of a compressed tablet is above 40 N, most preferably above 50 N or even above 100 N.

The solid cleaning compositions that make up tablet 30 contain one or more chemical constituents e.g., cleaning agents, disinfecting agents, and optionally, coloring agents, and fragrance in the form of a head. The cleaning activity is formed by water contacting the head of the device coming into contact with the one or more chemical constituents.

In preferred embodiments, the cleaning composition provides cleaning efficacy, a foaming visual cue, fragrance sensorial experience and slowly dissolves so one does not have to re-store or throw away the cleaning head portion of the product. The toilet cleaning head is advantageously dissolvable, which negates the need for the consumer to store an unpleasant, bacteria filled cleaning tool. The components of the cleaning composition are described in further detail herein.

Cleaning Composition

The cleaning composition can contain a variety of ingredients selected from surfactants, organic acid, organic acid buffering agents, cohesion polymer, and may also contain fragrance, dye, flow aid, colorant, binder, lubricant, glidant, etc. Water range of the ingredients typically ranges from 0.04 to about 0.68. The ideal water activity of ingredients falls between 0.14 to 0.25. Specific ingredients and amounts are further discussed herein.

Surfactant

The toilet cleaning composition comprises one or more surfactants, of which one or more is anionic, and the additional surfactants may be cationic and/or non-ionic and/or semi-polar and/or zwitterionic, or a mixture thereof. The cleaning composition may include a mixture one or more anionic surfactants with one or more non-ionic surfactants. The total active surfactant(s) is typically present at a level of from about 5% to 50% by weight, such as about 10% to about 30%, or about 12% to about 25%, based on total weight of the cleaning composition. The surfactant(s) is chosen based on the desired cleaning application, and may include any conventional surfactant(s) known in the art.

Anionic surfactants are useful in the context of this invention to both improve the cleaning properties of the compositions. The anionic surfactants used in this invention can be any anionic surfactant that is substantially water soluble. "Water soluble" surfactants are, unless otherwise noted, here defined to include surfactants which are soluble or dispersible to at least the extent of 0.01% by weight in distilled water at 25° C. "Anionic surfactants" are defined herein as amphiphilic molecules with an average molecular weight of less than about 10,000, comprising one or more functional groups that exhibit a net anionic charge when in aqueous solution at pH of between 6 and 11.

Non-limiting examples of anionic surfactants include sulfates and sulfonates, in particular, linear alkylbenzenesulfonates (LAS), isomers of LAS, branched alkylbenzenesulfonates (BABS), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS), fatty alcohol sulfates (FAS), primary alcohol sulfates (PAS), alcohol ethersulfates (AES or AEOS or FES, also known as alcohol ethoxysulfates or fatty alcohol ether sulfates), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid or salt of fatty acids (soap), and combinations thereof.

The anionic surfactant may be, for example, Sodium Xylene Sulphonate, Sodium Dodecylbenzenesulfonate, Sodium C14-C16 Alpha Olefin Sulfonate, Sodium Cocosulfate, Sodium Lauryl Sulfate, Sodium Cocoyl Isethionate, Sodium Olefin Sulphonate.

In some preferred embodiments, the anionic surfactant is a LAS.

In certain preferred embodiments, the anionic surfactant is selected from Sodium Dodecylbenzenesulfonate, Sodium Cocoyl Isethionate, Sodium Olefin Sulphonate, and combinations thereof.

The cleaning composition will usually contain from about 5% to about 50% by weight of anionic surfactant. In certain embodiments, the cleaning composition contains about 7% to about 35% by weight of anionic surfactant. In some preferred embodiments, the cleaning compositions contain about 10% to about 30% by weight of anionic surfactant.

The amount of anionic surfactant utilized may be dependent on the choice and amount of filler and the desired dissolution rate of a solid unit dose formed from the cleaning composition, as is discussed in further detail below.

Non-ionic surfactants ("NI") are useful in the context of this invention to both improve the cleaning properties of the compositions, when used as a detergent, and to contribute to product stability. A wide range of non-ionic surfactants can be used herein. For example, the non-ionic surfactants include, but are not limited to alkoxylated alcohols, polyoxyalkylene alkyl ethers, polyoxyalkylene alkylphenyl ethers, polyoxyalkylene sorbitan fatty acid esters, polyoxyalkylene sorbitol fatty acid esters, polyalkylene glycol fatty acid esters, alkyl polyalkylene glycol fatty acid esters, polyoxyethylene polyoxypropylene alkyl ethers, polyoxyalkylene castor oils, polyoxyalkylene alkylamines, glycerol fatty acid esters, alkylglucosamides, alkylglucosides, alkylamine oxides, or a combination thereof. Preferably, the nonionic surfactant is a glucamide in aqueous-alcoholic solution, such as Capryloyl/Caproyl Methyl Glucamide.

If included in the cleaning compositions, the amount of NI is typically about 1 weight percent to about 20 weight percent based on the total weight of the cleaning composition. Preferably, the NI is at least about 1.5 weight percent, most preferably about 1.5 to about 15 weight percent based on total weight of the cleaning composition.

When included therein the cleaning composition will usually contain from about from about 1% to about 40% by weight of a cationic surfactant, for example from about 0.5% to about 30%, in particular from about 1% to about 20%, from about 3% to about 10%, such as from about 3% to about 5%, from about 8% to about 12% or from about 10% to about 12%. Non-limiting examples of cationic surfactants include alkyldimethylethanolamine quat (ADMEAQ), cetyltrimethylammonium bromide (CTAB), dimethyldistearylammonium chloride (DSDMAC), and alkylbenzyldimethylammonium, alkyl quaternary ammonium compounds, alkoxylated quaternary ammonium (AQA) compounds, ester quats, and combinations thereof.

The cleaning composition may contain from about 0% to about 40% by weight of a semipolar surfactant. Non-limiting examples of semipolar surfactants include amine oxides (AO) such as alkyldimethylamineoxides, N-(coco alkyl)-N,N-dimethylamine oxide and N-(tallow-alkyl)-N,N-bis(2-hydroxyethyl)amine oxide, and combinations thereof.

The cleaning composition may contain from about 0% to about 40% by weight of a zwitterionic surfactant. Non-limiting examples of zwitterionic surfactants include betaines such as alkyldimethylbetaines, sulfobetaines, and combinations thereof.

Organic Acid

Examples of acids suitable for use the cleaning compositions include, but are not limited to, tartaric acid, citric acid, fumaric acid, adipic acid, malic acid, oxalic acid, or sulfamic acid, either alone or in combination. Typically, the compositions are prepared from citric acid or a combination of citric acid and glycolic acid.

The acid comprises about 1% to about 60%, more preferably about 25% to about 45% by weight of the cleaning composition.

The acid and an organic acid buffering agent, e.g., carbonate or bicarbonate salt, may result in the composition being effervescent. In certain embodiments, the presence of bubbles results from the formation of carbon dioxide. For instance, when added to a liquid, such as water, a mixture of at least one organic acid and at least one carbonate or bicarbonate salt results in a chemical reaction that liberates carbon dioxide. In one aspect, both the acid and the salt may be in anhydrous form.

The term "effervescent," as defined herein, means any product capable of forming bubbles in liquid environments and may also be considered any product capable of liberating carbon dioxide in or out of liquid environments. Likewise, "effervescence" means forming bubbles in liquid environments or liberating carbon dioxide in or out of liquid environments.

Organic Acid Buffering Agent

Examples of organic acid buffering agents are carbonate or bicarbonate salts. Carbonate or bicarbonate salts suitable for use in illustrative embodiments include, but are not limited to, the alkali metal salts. Sodium carbonate, calcium carbonate, magnesium carbonate, ammonium carbonate, potassium carbonate, sodium bicarbonate, and calcium bicarbonate may all be employed.

The carbonate or bicarbonate salts may be added in an amount of about 1% to about 50% by weight of the composition, more preferably about 5% to about 30% by weight of the composition, most preferably about 10% to about 20% by weight of the composition.

Cohesion Polymer

Polyethylene glycol having a molecular weight greater than 3,350 has been found to be a particularly advantageous water-soluble binder.

In some embodiments, the polyethylene glycol has molecular weight greater than 4,000, more preferably greater than 6,000, most preferably about 7,300 to about 9,000. In certain particularly preferred embodiments, the polyethylene glycol has an average molecular weight of about 8,000.

The polyethylene glycol is present from about 10% to about 40% by weight of the composition, preferably from about 12.5% to about 25%, most preferably from 15% to about 25% by weight of the cleaning composition.

Preferably, the composition does not contain any cohesion polymer other than polyethylene glycol having a molecular weight greater than 3,350.

Filler

The cleaning composition can include about 0% by about 20% fillers.

Fillers include water-soluble salts, clays, sugars, cellulose, and boron compounds. The water-soluble salt can be, for example, a water-soluble inorganic alkali metal salt, a water-soluble organic alkali metal salt, a water-soluble inorganic alkaline earth metal salt, a water-soluble organic alkaline earth metal salt, a water-soluble carbohydrate, a water-soluble silicate, a water-soluble urea, or any combination thereof. Examples include various alkali metal and/or alkaline earth metal sulfates, chlorides, borates, and citrates.

Cellulose fillers include microcrystalline cellulose ("MCC") and powdered cellulose, which are commercially available as inactive fillers in processed foods and pharmaceuticals. Instead of or in addition to powdered cellulose, cellulose derivatives such as ethyl cellulose, hydroxypropyl cellulose, carboxymethylcellulose, hydroxypropyl methyl cellulose, hydroxyethylmethyl cellulose, hydroxyethyl cellulose can be used. Preferably, the cellulose filler is microcrystalline cellulose.

Sugar fillers refer to saccharide containing components commonly known in the art, such as sucrose, dextrose, maltose, saccharose, lactose, sorbose, dextrin, trehalose, D-tagatose, dried invert sugar, fructose, levulose, galactose, corn syrup solids, and the like, alone or in combination.

The filler may comprise abrasive particles. By including abrasive particles, the cleaning composition provides for both scouring and cleaning of a surface. The carbonate or bicarbonate salt may in conjunction with the selected filler provide the cleaning composition with the aforementioned abrasive particles.

Most preferably the composition is free of filler.

Color

The cleaning composition may further include a colorant. The colorant may be oil- or water-soluble, and typically is an anhydrous powder dye. The amount of colorant to be used may depend on the color intensity desired and the cost of the dye, and may be added at levels up to about 2.5% by weight of the cleaning composition.

The choice of the colorant will depend largely on the color desired for the water into which the cleaning compositions is to be dispensed. Examples of suitable water-soluble colorants include, but are not limited to, acid blue #9, FD&C yellow #5, FD&C Red #33, and D&C Green #8. Oil-soluble colorants may be utilized.

Fragrance

The cleaning compositions may include fragrance and/or perfume. In some of embodiments, the fragrance may be released into the atmosphere through the formation of carbon dioxide. The fragrance is typically present in an amount of up to about 6% by weight of the cleaning composition.

The fragrance may be an oil fragrance, an essential oil, botanical extracts, synthetic fragrance materials, or other compounds that provide a desirable odor.

In some embodiments, a fragrance oil can be, for example, essential oils such as *angelica* root oil, anise oil, *arnica* blossom oil, basil oil, bay oil, champaca blossom oil, citrus oil, silver fir oil, silver fir cone oil, elemi oil, *eucalyptus* oil, fennel oil, pine needle oil, *galbanum* oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, canaga oil, cardamom oil, *cassia* oil, pine needle oil, copaiba balsam oil, coriander oil, spearmint oil, caraway oil, cumin oil, labdanum oil, lavender oil, lemongrass oil, lime blossom oil, lime oil, mandarin oil, balm oil, mint oil, musk seed oil, muscatel oil, myrrh oil, clove oil, neroli oil, niaouli oil, olibanum oil, orange blossom oil, orange oil, *origanum* oil, palmarosa oil, patchouli oil, peru balsam oil, petitgrain oil, pepper oil, peppermint oil, pimento oil, pine oil, rose oil, rosemary oil, sage oil, sandalwood oil, celery oil, spike oil, star anise oil, turpentine oil, *thuja* oil, thyme oil, *verbena* oil, vetiver oil, juniper berry oil, wormwood oil, wintergreen oil, ylang-ylang oil, hyssop oil, cinnamon oil, cinnamon leaf oil, citronella oil, lemon oil and cypress oil and ambrettolide, ambroxan, alpha-amylcinnamaldehyde, anethol, anisaldehyde, anise alcohol, anisol, anthranilic acid methyl ester, acetophenone, benzyl acetone, benzaldehyde, benzoic acid ethyl ester, benzophenone, benzyl alcohol, benzyl acetate, benzyl benzoate, benzyl formate, benzyl valerianate, borneol, bornyl acetate, boisambrene forte, alpha-bromostyrene, n-decyl aldehyde, n-dodecyl aldehyde, eugenol, eugenol methyl ether, eucalyptol, farnesol, fenchone, fenchyl acetate, geranyl acetate, geranyl formate, heliotropin, heptine carboxylic acid methyl ester, heptaldehyde, hydroquinone dimethyl ether, hydroxycinnamaldehyde, hydroxycinnamyl alcohol, indol, irone, isoeugenol, isoeugenol methyl ether, isosafrole, jasmone, camphor, carvacrol, carvone, p-cresol methyl ether, cumarin, p-methoxyacetophenone, methyl n-amyl ketone, methyl anthranilic acid methyl ester, p-methyl acetophenone, methyl chavicol, p-methyl quinoline, methyl beta-naphthyl ketone, methyl n-nonyl acetaldehyde, methyl n-nonyl ketone, muscone, beta-naphthol ethyl ether, beta-naphthol methyl ether, nerol, n-nonyl aldehyde, nonyl alcohol, n-octyl aldehyde, p-oxy-acetophenone, pentadecanolide, beta-phenyl ethyl alcohol, phenyl acetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, gamma-undelactone, vanillin, veratrum aldehyde, cinnmaldehyde, cinnamyl alcohol, cinnamic acid, cinnamic acid ethyl ester, cinnamic acid benzyl ester, diphenyl oxide, limonene, linalool, linalyl acetate and propionate, melusat, menthol, menthone, methyl n-heptenone pinene, phenyl acetaldehyde, terpinyl acetate, citral, citronellal, and mixtures thereof.

In some embodiments, the fragrance can be an ester, an ether, an aldehyde, a ketone, an alcohol, a hydrocarbon, an essential oil, and a combination thereof.

In some embodiments, the fragrance can be, for example, adoxal (2,6,10-trimethyl-9-undecenal), anisaldehyde (4-methoxybenzaldehyde), cymal (3-(4-isopropyl-phenyl)-2-methylpropanal), ethylvanillin, florhydral (3-(3-isopropylphenyl)butanal), helional (3-(3,4-methylenedioxyphenyl)-2-methylpropanal), heliotropin, hydroxycitronellal, lauraldehyde, lyral (3- and 4-(4-hydroxy-4-methylpentyl)-3-cyclohexene-1-carboxaldehyde), methyl nonyl acetaldehyde, lilial (3-(4-tert-butylphenyl)-2-methylpropanal), phenyl acetaldehyde, undecylenaldehyde, vanillin, 2,6,10-trimethyl-9-undecenal, 3-dodecen-1-al, alpha-n-amylcinnamaldehyde, melonal (2,6-dimethyl-5-heptenal), 2,4-dimethyl-3-cyclohexene-1-carboxaldehyde (triplel), 4-methoxybenzaldehyde, benzaldehyde, 3-(4-tert-butylphenyl)propanal, 2-methyl-3-(paramethoxyphenyl) propanal, 2-methyl-4-(2,6,6-timethyl-2(1)-cyclohexen-1-yl)butanal, 3-phenyl-2-propenal, cis-/trans-3,7-dimethyl-2,6-octadien-1-al, 3,7-dimethyl-6-octen-1-al, [(3,7-dimethyl-6-octenyl) oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]decylidene-8)butanal, octahydro-4,7-methano-Hindenecarboxaldehyde, 3-ethoxy-4-hydroxybenzaldehyde, para-ethyl-alpha,alphadimethylhydrocinnamaldehyde, alpha-methyl-3,4-(methylenedioxy)hydrocinnamaldehyde, 3,4-ethylenedioxybenzaldehyde, alphan-hexylcinnamaldehyde, m-cymene-7-carboxaldehyde, alpha-methyl phenylacetaldehyde, 7-hydroxy-3,7-dimethyloctanal, undecanal, 2,4,6-trimethyl-3-cyclohexene-1-carboxaldehyde, 4-(3)(4-methyl-3-pentenyl)-3-cyclohexenecarboxaldehyde, 1-dodecanal, 2,4-dimethylcyclohexene-3-carboxaldehyde, 4-(4-hydroxy-4-methylpentyl)-3-cylohexene-1-carboxaldehyde, 7-methoxy-3,7-dimethyloctan-1-al, 2-methylundecanal, 2-methyldecanal, 1-nonanal, 1-octanal, 2,6,10-trimethyl-5,9-undecadienal, 2-methyl-3-(4-tertbutyl) propanal, dihydrocinnamaldehyde, 1-methyl-4-(4-methyl-3-pentenyl)-3-cyclohexene-1-carboxaldehyde, 5- or 6-methoxyhexahydro-4,7-methanoindane-1-or-2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3J-dimethyloctanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexene-carboxaldehyde, 3J-dimethyl-2-methylene-6-octenal, phenoxyacetaldehyde, 5,9-dimethyl-4,8-decadienal, peony aldehyde (6,10-dimethyl-3-oxa-5,9-undecadien-1-al), hexahydro-4,7-methanoindane-1-carboxaldehyde, 2-methyloctanal, alpha-methyl-4-(1-methylethyl)benzene acetaldehyde, 6,6-dimethyl-2-norpinene-2-propionaldehyde, paramethylphenoxyacetaldehyde, 2-methyl-3-phenyl-2-propen-1-al, 3,5,5-trimethylhexanal, hexahydro-8,8-dimethyl-2-naphthaldehyde, 3-propyl-bicyclo-[2.2.1]-hept-5-ene-2-carbaldehyde, 9-decenal, 3-methyl-5-phenyl-1-pentanal, methyl nonyl acetaldehyde, hexanel and trans-2-hexenal.

In some embodiments, the fragrance can be, for example, methyl betanaphthyl ketone, musk indanone (1,2,3,5,6,7-hexahydro-1,1,2,3,3-pentamethyl-4H-inden-4-one), tonalide (6-acetyl-1,1,2,4,4,7-hexamethyltetralin), alphadamascone, beta-damascone, delta-damascone, iso-damascone, damascenone, methyl dihydrojasmonate, menthone, carvone, camphor, koavone (3,4,5,6,6-pentamethylhept-3-en-2-one), fenchone, alpha-ionone, beta-ionone, gammamethyl ionone, fleuramone (2-heptylcyclopentanone), dihydrojasmone, cisjasmone, Iso E Super (1-(1,2,3,4,5,6J,8-octahydro-2,3,8,8-tetramethyl-2-naphthalenyl)ethan-1-one (and isomers)), methyl cedrenyl ketone, acetophenone, methyl acetophenone, para-methoxyacetophenone, methyl beta-naphtyl ketone, benzyl acetone, benzophenone, para-hydroxyphenylbutanone, celery ketone (3-methyl-5-propyl-2-cyclohexenone), 6-isopropyldecahydro-2-naphtone, dimethyl octenone, frescomenthe (2-butan-2-ylcyclohexan-1-one), 4-(1-ethoxyvinyl)-3,3,5,5-tetramethylcyclohexanone, methyl heptenone, 2-(2-(4-methyl-3-cyclohexen-1-yl)propyl)cyclopentanone, 1-(p-menthen-6(2)yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H)indanone, 4-damascol, dulcinyl(4-(1,3-benzodioxol-5-yl)butan-2-one), Hexalon (1-(2,6,6-trimethyl-2-cyclohexen-1-yl)-1,6-heptadien-3-one), isocyclemone E (2-acetonaphthone-1,2,3,4,5,6,7,8-octahydro-2,3,8,8-tetramethyl), methyl nonyl ketone, methyl cyclocitrone, methyl lavender ketone, orivone (4-tert-amylcyclohexanone), 4-tert-butylcyclohexanone, delphone (2-pentyl cyclopentanone), muscone (CAS 541-91-3), neobutenone (1-(5,5-dimethyl-1-cyclohexenyl)pent-4-en-1-one), plicatone (CAS 41724-19-0), veloutone (2,2,5-trimethyl-5-pentylcyclopentan-1-one), 2,4,4,7-tetramethyloct-6-en-3-one and tetrameran (6,10-dimethylundecen-2-one).

In some embodiments, the fragrance can be, for example, 10-undecen-1-ol, 2,6-dimethylheptan-2-ol, 2-methylbutanol, 2-methylpentanol, 2-henoxyethanol, 2-phenylpropanol, 2-tert-butylcyclohexanol, 3,5,5-trimethylcyclohexanol, 3-hexanol, 3-methyl-5-phenylpentanol, 3-octanol, 3-phenylpropanol, 4-heptenol, 4-isopropylcyclohexanol, 4-tert-butylcyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, β-terpineol, butyl salicylate, citronellol, cyclohexyl salicylate, decanol, dihydromyrcenol, dimethyl benzyl carbinol, dimethyl heptanol, dimethyl octanol, ethyl salicylate, ethyl vanillin, eugenol, farnesol, geraniol, heptanol, hexyl salicylate, isoborneol, isoeugenol, isopulegol, linalool, menthol, myrtenol, n-hexanol, nerol, nonanol, octanol, p-menthan-7-ol, phenylethyl alcohol, phenol, phenyl salicylat, tetrahydrogeraniol, tetrahydrolinalool, thymol, trans-2-cis-6-nonadicnol, trans-2-nonen-1-ol, trans-2-octenol, undecanol, vanillin, champiniol, hexenol and cinnamyl alcohol.

In some embodiments, the fragrance can be, for example, for example, benzyl acetate, phenoxyethyl isobutyrate, p-tert-butylcyclohexyl acetate, linalyl acetate, dimethyl benzyl carbinyl acetate (DMBCA), phenyl ethyl acetate, benzyl acetate, ethylmethylphenyl glycinate, allyl cyclohexyl propionate, styralyl propionate, benzyl salicylate, cyclohexyl salicylate, floramat, melusat and jasmacyclat.

In one embodiment, the fragrance can be, for example, for example, benzyl ethyl ether and ambroxan. The hydrocarbons include mainly terpenes, such as limonene and pinene.

In some embodiments, the fragrance is, for example, a musky scent, a pungent scent, a camphoraceous scent, an ethereal scent, a floral scent, a fruity scent, a peppermint scent, an aromatic scent, a gourmand scent, or any combination thereof.

In some embodiments, the fragrance can be mixtures of various fragrances, which can be referred to as a perfume or perfume oil. Perfume oils of this kind may also contain natural fragrance mixtures, as are obtainable from plant sources.

In some embodiments, the fragrance can be a fragrance precursor. "Fragrance precursor" refers to compounds which only release the actual fragrance following chemical conversion/separation, for example, when exposed to light or other environmental conditions, such as pH, temperature, etc. Treatment agents of this kind are often referred to as pro-fragrances.

Other fragrances known in the art, or any fragrance commercially available from a fragrance supplier (e.g., Firmenich, Givaudan, IFF, Symrise, Agilex, The Good Scents Company, Atlanta, Ga.).

Other fragrances and/or perfumes useful in the practice of the invention include the fragrances commonly used in the household and industrial cleaning and sanitizing industry.

As those of skill will appreciate, fragrances typically comprise highly concentrated solid ingredients. The presence of a non-hygroscopic solvent may be necessary to dissolve, disperse or mix these solid ingredients to make the fragrance homogenous throughout the solid cleaning head. Since fragrance manufacturers often incorporate solvents directly into their fragrances, coordinating solvent selection with the fragrance manufacturer may be necessary.

In some embodiments, the fragrance is, for example, present in the cleaning composition in an amount of about 0.5 wt. %, about 1.0 wt. %, about 1.5 wt. %, about 2.0 wt. %, about 3.0 wt. %, about 4.0 wt. %, or about 5.0 wt. %. In some embodiments, the fragrance is, for example, present in an amount from about 0.1 wt. % to about 5 wt. %, from about 0.5 wt. % to about 4.5 wt. %, about 0.5 wt. % to about 4 wt. %, from about 1.0 wt. % to about 4 wt. %, or from about 1.5 wt. % to about 4 wt. %.

Other Components:

The solid cleaning composition can comprise other customary additives such as lubricants, glidants, and disintegrants, typically in small amount such as under 5%, more preferably less than 2.5%, most preferably less than 1% by weight of the composition.

Disintegrant

Disintegrants can be added to aid the breakdown of the puck. Preferred disintegrants include corn starch, Polyvinylpyrillidone (PVP) cross-linked, PVP (not cross-linked) and microcrystalline cellulose (MCC).

Lubricant

A lubricant may be used in the cleaning formulations. The lubricant should combine hydrophobic and hydrophilic properties in order to achieve both good lubrication and a short disintegration time. Surfactants such as sodium lauryl sulfate, fumaric acid, magnesium stearate and magnesium lauryl sulfate can be used. The lubricant may also be selected from wheat germ oil, canola oil, safflower oil, sunflower seed oil, sesame oil, cotton seed oil, corn oil, palm oil, coconut oil, flax seed oil, olive oil, mineral oil, PEG 200, PEG 300, PEG 400, and combinations thereof.

A lubricant can also be added when compressing the composition. For example, optionally prior to introduction of a preform into a die, one or more of the interior surfaces of the mold may be sprayed with a mold release material or other lubricant such as mineral oil or a paraffin oil.

The lubricant may be included up to 5% by weight of the composition, preferably less than about 1% by weight, more preferably about 0.5% by weight or less of the composition.

Glidant

A glidant may be included in the composition to promote the flow properties of tablet granules or powder materials.

Examples of glidants that may be used include colloidal silicon dioxide, talc, tribasic calcium phosphate, hydrophobic colloidal silica, hydrophobic fumed silica, cellulose, magnesium oxide, sodium stearate, magnesium silicate, and magnesium trisilicate.

Method of Preparation

The solid cleaning compositions described herein can be manufactured by various compression methods including direct compression, or wet granulation and/or dry granulation followed by compression.

In one embodiment, the method of manufacture may comprise grinding all powder materials to a fine particle size using a mortar and pestle or by passing through a sieve; melting ingredients, such as nonionic surfactant, to around 80° C. and combining all the materials until uniform. The resulting mixture is then pressed into tablets.

In another embodiment, powder ingredients can be combined in a v-blender or with a mixer and directly compressed into a tablet.

In yet another embodiment, an acid premix and a basic premix may be prepared and sieved or ground to a fine particle size. The two mixtures can each be wet granulated and dried in an oven. The dried granules are blended together with any extragranular glidant and/or lubricant. The final mixture is compressed into tablets.

Typically, the unit dose is manufactured by compression on conventional tablet press using round or oval convex or flat face tooling. In preferred embodiments, the tooling is designed such that the compressed solid contains socket 36 in at least one of its surfaces that can be adapted to receive a wand 50. The depth of the socket $Y_c$-$Y_d$ can be less than the height $Y_a$-$Y_b$ or can be the same as height $Y_a$-$Y_b$. In one embodiment, as shown in FIGS. 1 and 2, the compressed solid can comprise an annular shape with a cylindrical socket 36 in its center that extends either partially or entirely through the height of the compressed solid, whereby the compressed solid can be mounted on a pin extending from wand 50.

The depth of the indentation may be anywhere from 25% to 100% of the height of the compressed solid.

Weights of tablets: the tablets will typically weigh about 25 to about 45 grams, most preferably 25 to about 35 grams.

Hardness: A tablet strength above 50 N is preferred.

Figure 4:
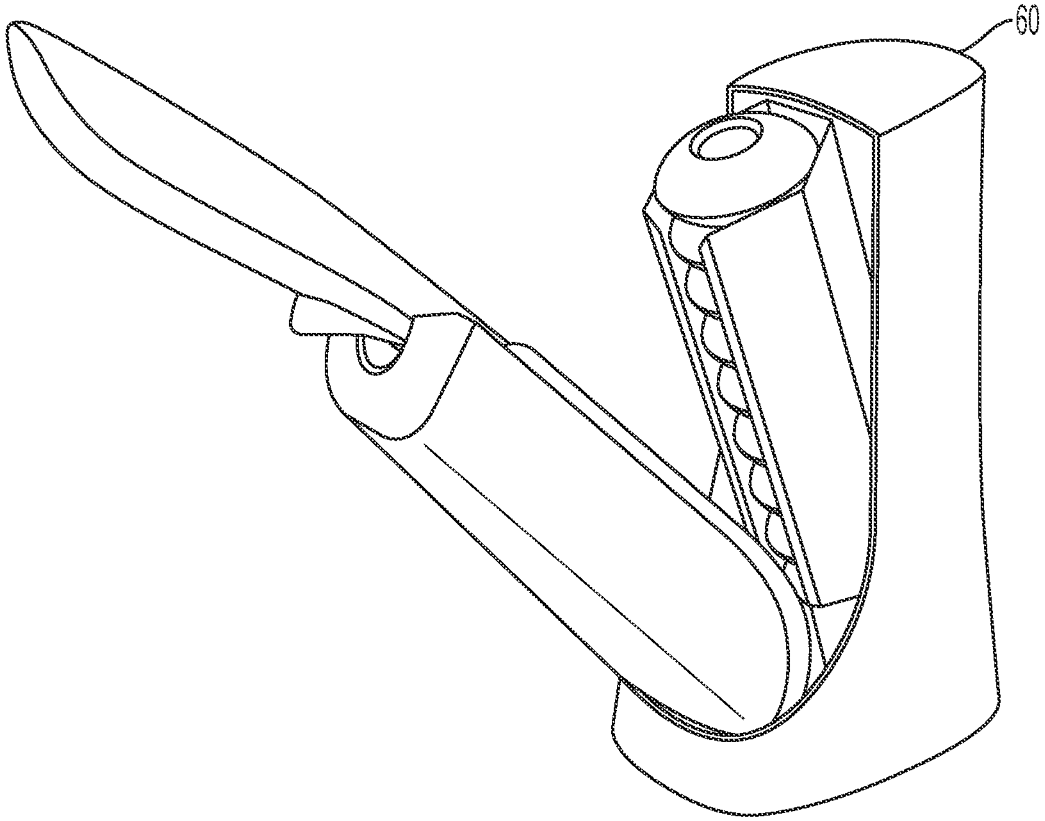
FIG. 4 shows an exemplary caddy system that can hold a wand and a plurality of the tablets described herein.

A plurality of tablets 30 may be packaged together. As shown in FIG. 4, a plurality of tablets may be stored in a caddy 60 with wand 50.

Methods of Use

To use the cleaning compositions to clean a surface, the composition is formed into a tablet and the unit is exposed to a solvent, typically water, which is capable of dissolving the water-soluble filler and surfactant. The cleaning composition may be submerged in water from a toilet, sink, or bathtub depending on the surface being cleaned. Preferably, the cleaning composition is attached to a wand 50 as shown in FIG. 3, which can assist in submerging the tablet and rubbing it against the surface of a toilet bowl.

Upon contact with the solvent, the composition begins to dissolve. The surfactant provides the detergent for cleaning the surface. The surfactant will foam when exposed to the solvent.

Upon continual exposure to the solvent, more of the composition is dissolved. The wand is used to manually rub the tablet along a toilet surface further adding abrasive action of the composition.

Upon completion of the cleaning, the user may flush the composition down the toilet. Preferably, the tablet is released from the wand prior to fully dissolving and flushing.

EXAMPLES

Example 1

Three compositions I1-I3 in TABLE 1 comprising 25% to 50% by weight PEG-8000 (90-100% polyethylene glycol having average molar mass of 8,000) were combined into a direct compression mixture and compressed into tablets. Two comparative compositions C1 and C2 containing no PEG-8000 were prepared. The anionic surfactant was C14/16-alpha olefin sulphonate sodium salt. All ingredients except fragrance were combined in a KITCHENAID 4.5 quart tilt-head stand mixer and mixed for 15 minutes. The fragrance was added and the blend was mixed for an additional 10 minutes. Tablets having weight of about 35 g were prepared with round tooling having a tapered center hole (61 mm diameter×14 mm height with a top hole of 22 mm in diameter and bottom hole of 30 mm in diameter) using a Carver Press (model 3851-0) at 7.5 MT force.

Dissolution of the tablets was measured in 3 liters of 70° F. water without agitation. The tablets were placed in the water for 10 minutes and then left to dry for 24 hours and re-weighed. The percent dissolution was calculated as (original weight−post-test weight)/original weight.

Tablet strength was measured by placing the tablet vertically on a Tinius Olsen instrument.

TABLE 1

| Ingredient/Comp. | C1 | C2 | I1 | I2 | I3 |
|---|---|---|---|---|---|
| PEG-8000 | 0.0 | 0.0 | 25.0 | 37.5 | 50 |
| Citric Acid | 20.2 | 42.9 | 20.5 | 16.1 | 11.7 |
| Anionic Surfactant | 14.0 | 21.0 | 14.0 | 14.0 | 14.0 |
| Sodium Bicarbonate | 37.2 | 5.5 | 37.8 | 29.9 | 21.8 |
| Ground Soap | 6.0 | 15.0 | 0.0 | 0.0 | 0.0 |
| Precipitated Calcium Silicate (desiccant) | 0.0 | 0.5 | 0.0 | 0.0 | 0.0 |
| Sodium Chloride | 10.0 | 3.0 | 0.0 | 0.0 | 0.0 |
| Corn Starch | 10.0 | 3.0 | 0.0 | 0.0 | 0.0 |
| Acid Blue | 0.0 | 0.0 | 0.0 | 0.0 | 0.0 |
| Fragrance | 2.5 | 2.1 | 2.5 | 2.5 | 2.5 |
| 10 min. Dissolution (%) | 17 | 11 | 49 | 32 | 19 |
| Strength (N) | 54 | 29 | 39 | 49 | 57 |

Improved dissolution and tablet strength were observed for all compositions containing PEG-8000. A dissolution improvement of over 4× in conjunction with increased tablet strength was observed when using 25% PEG-8000.

Example 2

The effect of changing tablet dimensions of a compressed toilet cleaning puck composition having 25% PEG-8000 was assessed.

Composition I1 of Example 1 was utilized. Compressed pucks were created by dry blending powders and then pressing into 35 g and 25 g donut shaped tablets (puck). All pucks were pressed on a Carver Press (model 3851-0) at 7.5 MT.

Dimensions

A (35 mg): 14 mm height×61 mm diameter and containing a hole in the center that is approximately 13 mm at the top and 30 mm at the bottom.

B (25 mg): 14 mm height×48 mm diameter and containing a hole in the center that is approximately 13 mm at the top and 20 mm at the bottom.

Strength: To determine tablet strength (or hardness), the tablet was placed in a Dr. Schleuniger Pharmatron Model 6D Tablet Tester. The machine's default setting then crushes the tablet and gives a Newton force hardness measure.

TABLE 2A

| Hardness (N) | |
|---|---|
| A: 35 g Puck | B: 25 g Puck |
| 39 | 94 |

Dissolution: the dissolution of the pucks was assessed by placing in 3 liters of 20° C. tap water for 10 minutes with no agitation, then removing, drying for 24 hours, and weighing. The weight after drying was compared with the original weight before placing in water to calculate the % dissolved.

TABLE 2B

| Dissolution (%) | |
|---|---|
| A: 35 g Puck | B: 25 g Puck |
| 49 | 53 |

Tablets having a height to diameter ratio of 0.22 and 0.29 exhibited satisfactory strength and dissolution.

Example 3

A composition I4 comprising 10% by weight PEG-8000 (90-100% polyethylene glycol having average molar mass of 8,000) and the additional ingredients shown in TABLE 3 was prepared in the manner described in Example 1. The anionic surfactant was C14/16-alpha olefin sulphonate sodium salt. Tablets weighing about 25 g were prepared with round tooling having a tapered center hole (48 mm diameter×14 mm height with a top hole of 13 mm in diameter and bottom hole of 20 mm in diameter) using a Carver Press (model 3851-0) at 7.5 MT force.

TABLE 3

| Ingredient/Comp. | I4 |
|---|---|
| PEG-8000 | 10.0 |
| Citric Acid | 26.0 |
| Anionic Surfactant | 14.0 |
| Sodium Bicarbonate | 47.8 |
| Acid Blue | 0.0 |
| Fragrance | 2.1 |
| 10 min. Dissolution (%) | 78.5 |
| Strength (N) | 78 |

The smaller tablet dimensions allow for a reduction in the amount of PEG while still maintaining tablet strength above 50 N, although small cracks in the center cavity were observed. The cracks, however, did not appear to impact stability of the tablet while on a cleaning wand. Clean times of over 5 minutes per use were achievable without breakage.

Example 4

Several low pH cleaning tablet formulations I5-I10 resulting in pH 4.3 when dissolved in water were prepared using 10% to 25% PEG-8000 (90-100% polyethylene glycol having average molar mass of 8,000). The anionic surfactant was C14/16-alpha olefin sulphonate sodium salt (AOS). Tablets weighing about 25 g were prepared with round tooling having a tapered center hole (48 mm diameter×14 mm height with a top hole of 13 mm in diameter and bottom hole of 20 mm in diameter) using a Carver Press (model 3851-0) at 7.5 MT force.

TABLE

| | Comp. | | | | | |
|---|---|---|---|---|---|---|
| Ingredient | I5 | I6 | I7 | I8 | I9 | I10 |
| PEG-8000 | 10.0 | 12.5 | 15.0 | 17.5 | 20.0 | 25.0 |
| Citric Acid | 44.8 | 43.2 | 41.7 | 40.2 | 38.7 | 35.6 |
| Anionic Surfactant | 14.0 | 14.0 | 14.0 | 14.0 | 14.0 | 14.0 |
| Sodium Bicarbonate | 28.6 | 27.6 | 26.7 | 25.7 | 24.7 | 22.8 |
| Precipitated Silicate | 0.5 | 0.5 | 0.5 | 0.5 | 0.5 | 0.5 |
| Dye | 0.0 | 0.0 | 0.0 | 0.0 | 0.0 | 0.0 |
| Fragrance | 2.1 | 2.1 | 2.1 | 2.1 | 2.1 | 2.1 |
| 10 min. Dissolution (%) | 73.2 | 73.0 | 67.6 | 69.7 | 66.5 | 63.1 |
| Strength (N) | 92 | 105 | 124 | 103 | 109 | 103 |

All formulas I5-I10 were successfully pressed at 7.5 metric tons of force (25 grams per puck), but it was observed that at 10% PEG and 12.5% PEG, small cracks were present on the inside cavity of the puck (likely due to the Precipitated Silicate drying out the powder mix and making binding more difficult). However, these cracks were not present at a PEG-8000 level greater than 15% by weight. Based on this result, it was observed that a formula containing at least 15% by weight PEG-8000 with 14% AOS surfactant provides preferred puck cohesion. Although the 10% PEG and 12.5% PEG formulas provided pucks with small cracks, the pucks appeared to still be usable for purposes of the invention.

It is expected that formulas using solid polyethylene glycols having average molecular weight greater than 3,350, e.g., PEG-4000, PEG-6000, will behave similarly to the exemplary formulas containing PEG-8000.

It will be appreciated that, within the principles described by this specification, a vast number of variations exist. It should also be appreciated that the embodiments described are only embodiments, and are not intended to limit the scope, applicability, or construction of the claims in any way.

What is claimed is:

1. A compressed toilet brush composition consisting of:

an anionic surfactant in an amount of from about 10% to about 25% by weight, based on the total weight of the compressed toilet brush composition;

citric acid in an amount of from about 10% to about 20% by weight, based on the total weight of the compressed toilet brush composition;

a citric acid buffering agent in an amount of from about 10% to about 40% by weight, based on the total weight of the compressed toilet brush composition;

polyethylene glycol having a weight average molecular weight of about 8,000 in an amount of from about 15% to about 25% by weight, based on the total weight of the compressed toilet brush composition; and at least one of a lubricant, a glidant, a dye, or a fragrance.

2. The compressed toilet brush composition of claim 1, wherein the an- ionic surfactant is an alpha olefin sulphonate.

3. The compressed toilet brush composition of claim 1, wherein the anionic surfactant is selected from the group consisting of sodium dodecylbenzenesulfonate, sodium cocoyl isethionate, sodium olefin sulphonate, and any combination thereof.

4. The compressed toilet brush composition of claim 1, wherein the lubricant is selected from the group consisting of sodium lauryl sulfate, fumaric acid, magnesium stearate, magnesium lauryl sulfate, wheat germ oil, canola oil, safflower oil, sunflower seed oil, sesame oil, cotton seed oil, corn oil, palm oil, coconut oil, flax seed oil, olive oil, mineral oil, polyethylene glycol 200, polyethylene glycol 300, polyethylene glycol 400, and any combination thereof.

5. The compressed toilet brush composition of claim 1, wherein the lubricant is in an amount up to 0.5% by weight, based on the total weight of the compressed toilet brush composition.

6. The compressed toilet brush composition of claim 1, wherein the glidant is selected from the group consisting of colloidal silicon dioxide, talc, tribasic calcium phosphate, hydrophobic colloidal silica, hydrophobic fumed silica, cellulose, magnesium oxide, sodium stearate, magnesium silicate, magnesium trisilicate, and any combination thereof.

7. The compressed toilet brush composition of claim 1, wherein the dye is anhydrous powder dye.

8. The compressed toilet brush composition of claim 1, wherein the fragrance is selected from the group consisting of an essential oil, a botanical extract, a synthetic fragrance material, an ester, an ether, an aldehyde, a ketone, an alcohol, a hydrocarbon, and any combination thereof.

9. The compressed toilet brush composition of claim 1, wherein a weight ratio of the anionic surfactant to the polyethylene glycol is from about 1:2 to about 2:1.

10. The compressed toilet brush composition of claim 1, wherein greater than 30% of the compressed toilet brush composition is configured to dissolve when the compressed toilet brush composition is submerged in toilet water without agitation for a time of 10 minutes.

11. The compressed toilet brush composition of claim 1, wherein the compressed toilet brush composition has a hardness of at least 50 N.

12. The compressed toilet brush composition of claim 1, wherein the compressed toilet brush composition has a pH less than 4.6.

13. The compressed toilet brush composition of claim 1, wherein the compressed toilet brush composition is formed as a compressed toilet brush tablet.

14. The compressed toilet brush composition of claim 13, wherein the compressed toilet brush tablet defines an indentation in at least one surface that is adapted to receive and engage with a wand.

15. The compressed toilet brush composition of claim 14, wherein the indentation is a cylindrical socket.

16. A kit comprising the compressed toilet brush tablet of claim 14 and a wand.

17. The compressed toilet brush composition of claim 1, wherein the citric acid buffering agent is selected from the group consisting of a carbonate salt, a bicarbonate salt, and any combination thereof.

18. The compressed toilet brush composition of claim 1, wherein the citric acid buffering agent is selected from the group consisting of sodium carbonate, calcium carbonate, magnesium carbonate, ammonium carbonate, potassium carbonate, sodium bicarbonate, calcium bicarbonate, and any combination thereof.

* * * * *